UNITED STATES PATENT OFFICE.

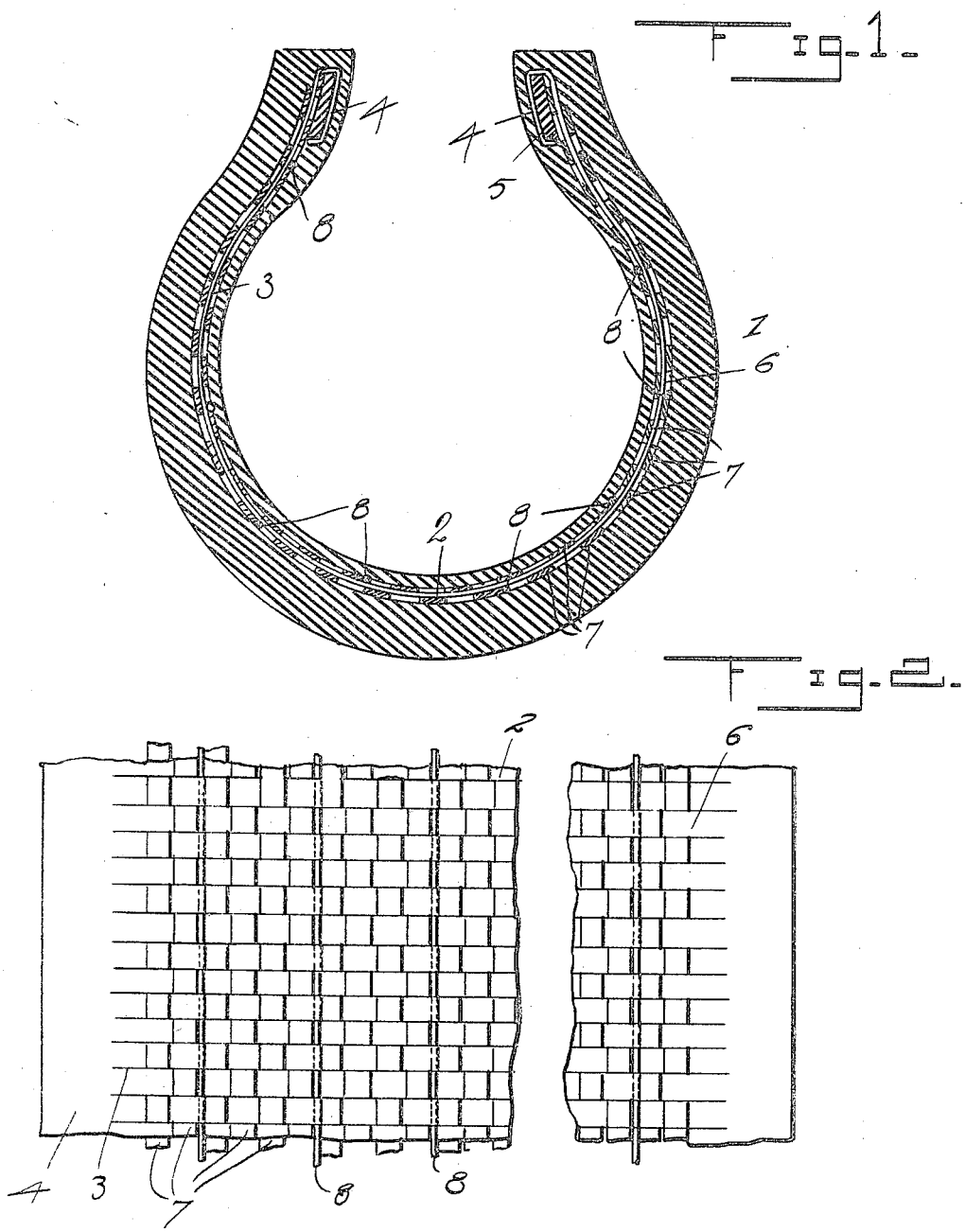

DEFOREST E. JOHNSON, OF HINSDALE, NEW YORK.

PNEUMATIC TIRE.

1,240,051. Specification of Letters Patent. Patented Sept. 11, 1917.

Application filed March 21, 1916. Serial No. 85,637.

*To all whom it may concern:*

Be it known that I, DEFOREST E. JOHNSON, a citizen of the United States, residing at Hinsdale, in the county of Cattaraugus and State of New York, have invented certain new and useful Improvements in Pneumatic Tires; and I do hereby declare the following to be a full, clear, and exact description of the invention, such as will enable others skilled in the art to which it appertains to make and use the same.

The invention relates to improvements in pneumatic tires.

The object of the present invention is to improve the construction of pneumatic tires, more especially the outer tube or shoe and to provide a simple, practical, and efficient construction adapted to effectually prevent blow outs and punctures and capable of increasing the strength, durability, and efficiency of the outer tube or shoe without liability of cutting or otherwise injuring the same.

A further object of the invention is to provide an outer tube or shoe equipped with a metallic armor section or layer extending entirely around the outer tube or shoe and across the tread and on each side of the tire and provided with means for enabling it to be vulcanized to the contiguous layers or portions of the tire.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawings

Figure 1 is a transverse sectional view of the outer tube or shoe of a pneumatic tire constructed in accordance with this invention, Fig. 2 is a plan view of a portion of the armor section.

Like numerals of reference designate corresponding parts in the several figures of the drawing.

In the accompanying drawing in which is illustrated the preferred embodiment of the invention, the outer tube or shoe 1 is provided with an armor section 2 constituting one of the layers of the tube or shoe and consisting of a piece of thin metal which may be sheet tin or any other suitable material and the said armor section which extends across the tread and on the sides from the tread to the bead portions of the outer tube or shoe is provided with transverse slits or incisions 3 which are continuous and terminate short of the side edges of the sheet metal to leave an integral imperforate connecting flange or portion 4 which is folded on itself and arranged in the bead forming a substantially U-shaped fold or portion 5. The transverse slits or incisions form a series of thin flexible strips 6 which increase the flexibility of the armor sections and with which are plaited longitudinal strips 7 of flexible material, preferably tape but any other fabric or other material possessing similar characteristics may be employed. The interwoven flexible longitudinal strips not only operate to hold the transverse metallic strips together but they also enable the metallic armor sections to be vulcanized to the adjacent layers of canvas or other material of the outer tube or shoe in which the armor section is embedded and of which it constitutes a continuous composite section of metal and fabric. The armor section is also provided with a plurality of circumferentially arranged wires 8 interlaced with the transverse metallic strips and arranged at intervals, as clearly illustrated in Fig. 2 of the drawing. The armor section presents a highly flexible metallic surface at both the tread and sides of the outer tube or shoe so that there is no liability of the inner tube being punctured and punctures and blow outs will be thereby effectually prevented. Also the highly flexible character of the armor section will enable the outer tube or shoe to respond to the cushioning action of the pneumatic tire and as the armor section is vulcanized to the adjacent layers of the tire there will be no relative movement of the parts of the outer tube or shoe. Furthermore, the armor section will not present any sharp edges to the material of the outer tube or shoe that will be liable to cut the same. The folding of the imperforate marginal side portions within the bead secures a firm anchoring of the armor section. The armor section is adapted to be applied to various types of tires and will provide a complete protection for the same at both the sides and tread.

What is claimed is:—

1. A tire of the class described including an armor section consisting of a strip of thin flexible sheet metal extending circumferentially around the tire and being of a width to extend across the tire from one base portion to the other and provided with transverse slits forming narrow contiguous transversely disposed flexible metallic strips and terminating short of the side edges of the metallic sheet to leave imperforate longitudinal marginal portions, and narrow longitudinally disposed fabric strips extending circumferentially around the tire and interlaced with the metallic transverse strips to enable the armor section to be vulcanized to the tire.

2. A tire of the class described including an armor section consisting of a strip of thin flexible metal extending circumferentially around the tire and being of a width to extend across the tire from one base portion to the other and provided with transverse slits forming narrow highly flexible contiguous transversely disposed metallic strips and terminating short of the side edges of the metallic sheet to leave imperforate longitudinal marginal portions, narrow longitudinal fabric strips of approximately the width of the transverse metallic strips extending circumferentially around the tire and interlaced with the said metallic transverse strips to enable the armor to be vulcanized to the tire, said imperforate marginal portions being folded within the base portions of the tire, and circumferentially disposed parallel wires arranged at intervals and interlaced with the transverse metallic strips.

In testimony whereof I affix my signature in presence of two witnesses.

DEFOREST E. JOHNSON.

Witnesses:
 MERLE E. THOMPSON,
 ROBBINS L. PIERCE.